(12) United States Patent
Cabri et al.

(10) Patent No.: US 10,414,829 B2
(45) Date of Patent: *Sep. 17, 2019

(54) PROCESS FOR THE PREPARATION OF SUGAMMADEX AND ITS INTERMEDIATES

(71) Applicant: FRESENIUS KABI IPSUM S.R.L., Cassina de' Pecchi (Milan) (IT)

(72) Inventors: Walter Cabri, Milan (IT); Antonio Ricci, Pescara (IT); Jacopo Zanon, Venice (IT); Saswata Lahiri, Ghaziabad (IN); Govind Singh, Ghaziabad (IN); Dominik Heckmann, Friedberg (DE)

(73) Assignee: FRESENIUS KABI IPSUM S.R.L., Cassina de' Pecchi (Milan) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/779,038

(22) PCT Filed: Nov. 23, 2016

(86) PCT No.: PCT/IB2016/057056
§ 371 (c)(1),
(2) Date: May 24, 2018

(87) PCT Pub. No.: WO2017/089966
PCT Pub. Date: Jun. 1, 2017

(65) Prior Publication Data
US 2018/0355070 A1 Dec. 13, 2018

(30) Foreign Application Priority Data

Nov. 25, 2015 (IN) ............................ 3843/DEL/2015

(51) Int. Cl.
*C08B 37/16* (2006.01)
*C08L 5/16* (2006.01)

(52) U.S. Cl.
CPC ............ *C08B 37/0012* (2013.01); *C08L 5/16* (2013.01)

(58) Field of Classification Search
None
See application file for complete search history.

(56) References Cited

U.S. PATENT DOCUMENTS

| | | | | |
|---|---|---|---|---|
| 2018/0171033 A1* | 6/2018 | Alaparthi | ............ | A61K 31/724 |
| 2018/0346608 A1 | 12/2018 | Cabri et al. | | |

FOREIGN PATENT DOCUMENTS

| | | | |
|---|---|---|---|
| CN | 101864003 A | 10/2010 | |
| CN | 104844732 A2 | 8/2015 | |
| CN | 105273095 A | 1/2016 | |
| EP | 3 380 530 A1 | 10/2018 | |
| EP | 3 380 554 A1 | 10/2018 | |
| IN | 20161008861 | 3/2015 | |
| IN | 2089/MUM/2015 | 5/2015 | |
| IN | 3842/DEL/2015 | 11/2015 | |
| IN | 3843/DEL/2015 | 11/2015 | |
| WO | WO 2001/040316 A1 | 6/2001 | |
| WO | WO 2012/025937 A1 | 3/2012 | |
| WO | WO 2014/125501 A1 | 8/2014 | |
| WO | WO 2016/194001 A1 | 8/2016 | |
| WO | WO 2017/089978 A1 | 6/2017 | |
| WO | WO 2017/163165 A1 | 9/2017 | |

OTHER PUBLICATIONS

Chmurski et al., "An Improved Synthesis of Per(6-Deoxyhalo) Cyclodextrins Using N-Halosuccinimides-Triphenylphosphine in Dimethylformamide," *Supramolecular Chemistry*, vol. 12, pp. 221-224 (2000).
European Patent Office, Third Party Observation filed in European Patent Application No. 16822742.9 (Oct. 4, 2018).
European Patent Office, Third Party Observation filed in European Patent Application No. 16822270.1 (Oct. 7, 2018).
U.S. Appl. No. 15/779,040, filed May 24, 2018.
U.S. Appl. No. 16/087,065, filed Sep. 20, 2018.
Chmurski et al., "An Improved Synthesis of 6-Deoxyhalo Cyclodextrins via Halomethylenemorpholinium Halides Vilsmeir-Haack Type Reagents," *Tetrahedron Letters* 38(42): 7365-7368 (1997).
European Medicines Agency, "Test Procedures and Acceptance Criteria for New Drug Substances and New Drug Products: Chemical Substances," Document CPMP/ICH/367/96 (2000) 32 pgs.
Hunt et al., "Structure and stability of columnar cyclomaltooctaose (γ-cyclodextrin) hydrate," *Carbohydrate Research* 340(9): 1631-1637 (2005).
European Patent Office, International Search Report in International Application No. PCT/IB2016/057056 (dated Feb. 21, 2017).
European Patent Office, Written Opinion in International Application No. PCT/IB2016/057056 (dated Feb. 21, 2017).
International Bureau of WIPO, International Preliminary Report on Patentability in International Application No. PCT/IB2016/057056 (dated May 29, 2018).
Comparison Report—Comparison of the procedures as disclosed in Example 3 of WO 2001/040316 A1, Example 1 of WO 2012/025937 A1, and Example 1 of WO 2014/125501 A1, and as reported in European Patent Application No. 16822742.9 (Feb. 1, 2019).
Comparison Report—Comparison of the procedures as disclosed in Example 3 of WO 2001/040316 A1, Example 1 of WO 2012/025937 A1, and Example 1 of WO 2014/125501 A1, and as reported in European Patent Application No. 16822270.1 (Feb. 1, 2019).

(Continued)

*Primary Examiner* — Layla D Berry
(74) *Attorney, Agent, or Firm* — Leydig, Voit & Mayer, Ltd.

(57) ABSTRACT

The present application provides an improved process for the preparation of sugammadex which comprises the halogenation of γ-cyclodextrin in a suitable organic solvent to give 6-per-deoxy-6-per-halo-γ-cyclodextrin, wherein halo is bromo or chloro, reacting the halogenated γ-cyclodextrin with 3-mercaptopropionic acid in the presence of alkoxide base to obtain sugammadex of formula I. This application also provides isolation of 6-per-deoxy-6-per-chloro-γ-cyclodextrin as a crystalline compound and its use for the preparation of sugammadex of formula (I).

12 Claims, 3 Drawing Sheets

(56) References Cited

OTHER PUBLICATIONS

Experimental Report—Reproduction of examples 1 and 3-6 of the European Patent Application No. 16822742.9 (Feb. 1, 2019).
Experimental Report—Reproduction of examples 1-4 of the European Patent Application No. 16822270.1 (Feb. 1, 2019).
Guillo et al., "Synthesis of symmetrical cyclodextrin derivatives bearing multiple charges," *Bull. Soc. Chim. Fr.* 132(8): 857-866 (1995).
Liu et al., "A Convenient Procedure for the Formation of Per(6-deoxy-6-halo)cyclodextrins Using the Combination of Tetraethylammonium Halide with [Et$_2$NSF$_2$]BF$_4$," *Synthesis* 45(22): 3103-3105 (2013).
Okamatsu et al., "Design and evaluation of folate-appended α-, β-, and γ-cyclodextrins having a caproic acid as a tumor selective antitumor drug carrier in vitro and in vivo," *Biomacromolecules* 14(12): 4420-4428 (2013).
International Bureau of WIPO, International Preliminary Report on Patentability in International Application No. PCT/IB2016/057088 (dated May 29, 2018).
International Bureau of WIPO, International Preliminary Report on Patentability in International Application No. PCT/IB2017/051594 (dated Sep. 25, 2018).
European Patent Office, Third Party Observation filed in European Patent Application No. 16822742.9 (Feb. 14, 2019).
European Patent Office, Third Party Observation filed in European Patent Application No. 16822742.9 (Apr. 9, 2019).
European Patent Office, Third Party Observation filed in European Patent Application No. 16822270.1 (Feb. 14, 2019).
European Patent Office, Third Party Observation filed in European Patent Application No. 16822270.1 (Apr. 9, 2019).
European Patent Office, Third Party Observation filed in European Patent Application No. 17720572.1 (Mar. 19, 2019).
European Patent Office, Third Party Observation filed in European Patent Application No. 17720572.1 (dated May 29, 2019).

\* cited by examiner

PROCESS FOR THE PREPARATION OF SUGAMMADEX AND ITS INTERMEDIATES

CROSS-REFERENCE TO RELATED APPLICATIONS

This patent application is the U.S. national phase of International Patent Application No. PCT/IB2016/057056, filed on Nov. 23, 2016, which claims the benefit of Indian Patent Application No. 3843/DEL/2015, filed Nov. 25, 2015, the disclosures of which are incorporated herein by reference in their entireties for all purposes.

FIELD OF THE INVENTION

The present application provides an improved process for the preparation of sugammadex. More particularly, the application relates to an improved process for the preparation of 6-per-deoxy-6-per-halo-γ-cyclodextrin and optionally its isolation as a crystalline compound, wherein said halo is bromo or chloro. This application also relates to the use of said crystalline 6-per-deoxy-6-per-halo-γ-cyclodextrin for the preparation of sugammadex which improves overall yield and/or purity of sugammadex.

The present application provides an improved industrially viable process, which is efficient and reproducible.

BACKGROUND OF THE INVENTION

Cyclodextrins (CDs) are a family of cyclic oligosaccharides composed of α-(1,4) linked glucopyranose subunits. According to the general accepted nomenclature of cyclodextrins an α (alpha)-cyclodextrin is a 6-membered ring molecule, a β (beta)-cyclodextrin is a 7-membered ring molecule and a γ (gamma)-cyclodextrin is a 8-membered ring molecule. The cyclodextrins are useful molecular chelating agents. They possess a cage-like supramolecular structure. As a result of molecular complexation phenomena CDs are widely used in many industrial products, technologies and analytical methods.

Sugammadex is marketed as Bridion® and structurally known as compound of formula I. It is an octa substituted γ-cyclodextrin derivative with a lipophilic core and a hydrophilic periphery.

Formula I

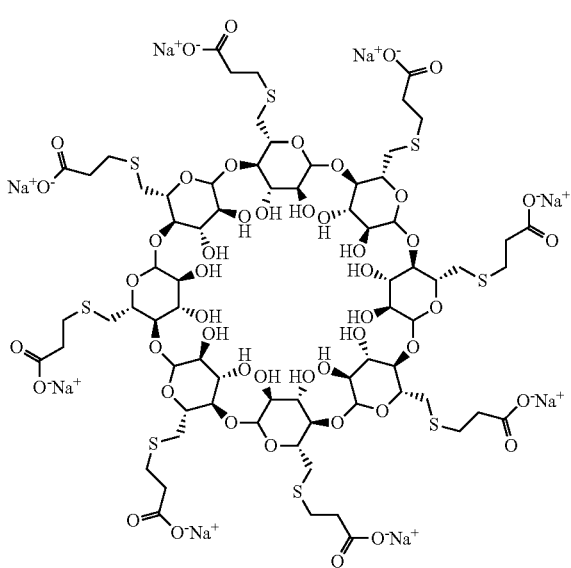

Sugammadex contains eight recurring amylose units each with five asymmetric carbon atoms, in total forty asymmetric carbon atoms for the whole molecule. The original configuration of all asymmetric carbon atoms is retained during the synthetic manufacturing process.

Sugammadex is known to be useful for the reversal of neuromuscular blockade induced by the steroidal neuromuscular blocking agents (NMBA) such as rocuronium, vecuronium and pipecuronium.

Sugammadex was disclosed in WO01/40316A1. This publication discloses a process for preparation of sugammadex which involves preparation of a halogenating agent by reacting triphenylphosphine, iodine and dry dimethylformamide. The halogenating agent is further reacted with dry γ-cyclodextrin of the compound of formula II at 70° C. for 24 hrs.

Formula II

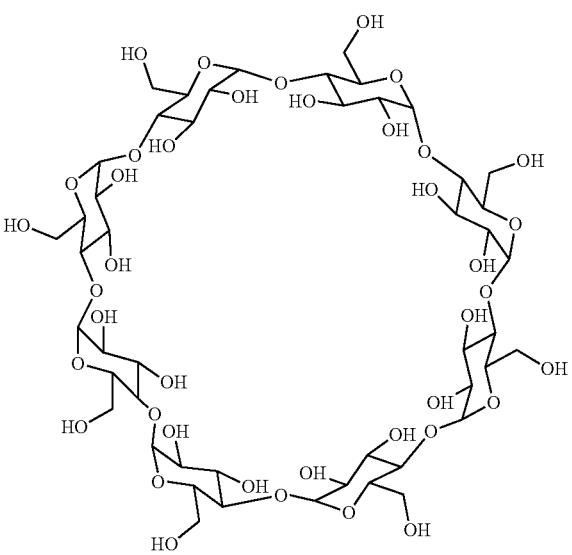

After reaction completion, the obtained solution is treated with sodium methoxide and methanol. The methanol is evaporated, then water is added to obtain hard viscous oil. The hard viscous oil is filtered and washed three times each with water and acetone to obtain 6-per-deoxy-6-per-iodo-γ-cyclodextrin as a yellow solid. The 6-per-deoxy-6-per-iodo-γ-cyclodextrin is reacted with 3-mercaptopropionic acid in the presence of sodium hydride in dry dimethylformamide to obtain sugammadex.

The process disclosed in WO01/40316A1 suffers from the following disadvantages:

(i) The preparation of a halogenating agent produces triphenylphosphine oxide as by product, which is very difficult to remove from the reaction mass. Normally it requires multiple washing with a solvent under inert atmosphere for complete removal.

(ii) The addition of sodium methoxide to the dimethylformamide solution is very exothermic and difficult to control.

(iii) The reaction mixture is very viscous after removal of methanol and cumbersome to stir.

(iv) The filtration of hard viscous oil is very slow which makes solvent washing very difficult and time consuming.

(v) The obtained yield of 6-per-deoxy-6-per-iodo-γ-cyclodextrin is very low (about 40%).
(vi) The purity of 6-per-deoxy-6-per-iodo-γ-cyclodextrin is also very low (about 20%).
(vii) The use of sodium hydride is also very challenging as it is associated with extensive foaming, formation of explosive hydrogen gas, and the addition of mineral oil to the reaction mixture.

WO2012/025937A1 discloses the preparation of sugammadex by chlorination of γ-cyclodextrin with a halogenating agent prepared from phosphorous pentachloride and dimethylformamide. After completion of the chlorination the solvent is removed to obtain a viscous residue. The viscous residue is diluted with water followed by adjusting the pH 8 with 5M sodium hydroxide to obtain a slurry. Said slurry is then filtered, washed with water and dried to give 6-per-deoxy-6-per-chloro-γ-cyclodextrin. The chlorinated γ-cyclodextrin is further reacted with 3-mercaptopropionic acid in the presence of sodium hydride in dimethylformamide to give sugammadex. This publication also discloses that the prepared halogenation agent reacts selectively with primary hydroxyl groups of γ-cyclodextrin to provide 6-per-deoxy-6-per-chloro-γ-cyclodextrin.

The process disclosed in WO2012/025937A1 suffers from the following disadvantages:
(i) The halogenating agent, which is prepared by reaction of phosphorous pentachloride and dimethylformamide, produces numerous phosphorous species on reaction with dimethylformamide, and its subsequent use for the halogenation of γ-cyclodextrin also produces phosphate esters as impurities which are difficult to remove.
(ii) The removal of dimethylformamide after chlorination of γ-cyclodextrin gives highly viscous oil, which is very cumbersome to stir.
(iii) The addition of water to the obtained viscous oil is highly exothermic and handling of such exothermic reaction is very difficult.
(iv) The filtration of 6-per-deoxy-6-per-chloro-γ-cyclodextrin is also very challenging due to its amorphous nature and it takes very long time for the filtration.
(v) The obtained yield of 6-per-deoxy-6-per-chloro-γ-cyclodextrin is very low (about 44%).
(vi) The purity of 6-per-deoxy-6-per-chloro-γ-cyclodextrin is also very low (about 22%).

WO2014/125501A1 discloses the preparation of sugammadex by chlorination of γ-cyclodextrin with a halogenating agent, prepared from phosphorous pentachloride and dimethylformamide. After completion of the chlorination, the mixture is quenched with water. The obtained mixture is hydrolyzed with aqueous sodium hydroxide solution, filtered, washed repeatedly with water and dried to give 6-per-deoxy-6-per-chloro-γ-cyclodextrin. The chlorinated γ-cyclodextrin is further reacted with 3-mercaptopropionic acid in presence of sodium methoxide in dimethylformamide to give crude sugammadex. The crude sugammadex is purified by treating with activated carbon in a mixture of water and methanol.

The process disclosed in WO2014/125501A1 suffers from the following disadvantages:
(i) The halogenating agent, which is prepared by reaction of phosphorous pentachloride and dimethylformamide, produces numerous phosphorous species on reaction with dimethylformamide, and its subsequent use for the halogenation of γ-cyclodextrin also produces phosphate esters as impurities which are difficult to remove.
(ii) The filtration of 6-per-deoxy-6-per-chloro-γ-cyclodextrin is very challenging as it takes very long time for the filtration due to its amorphous nature.
(iii) The purity of 6-per-deoxy-6-per-chloro-γ-cyclodextrin is also very low (about 23%).

Thus, the prior art procedures for the preparation of sugammadex suffer from the following disadvantages outlined below;
(i) The use of triphenylphosphine during the iodination of γ-cyclodextrin, the use of phosphorus based reagents for the halogenation of γ-cyclodextrin. These reagents produce unwanted impurities as by product which is very difficult to remove and require multiple purifications.
(ii) The handling of highly viscous reaction mixture of 6-per-deoxy-6-per-chloro-γ-cyclodextrin is very difficult.
(iii) The filtration of 6-per-deoxy-6-per-chloro-γ-cyclodextrin is also very challenging due to its amorphous nature.

Finally, the longer time duration, handling of reaction and multiple purifications for the removal of impurities are not desirable for the preparation of sugammadex and its intermediates.

SUMMARY OF THE INVENTION

In one aspect, the application provides an improved process for the preparation of sugammadex, comprising steps of:
a) reacting a γ-cyclodextrin of formula II with a halogenating agent selected from a group consisting of oxalyl chloride, oxalyl bromide, thionyl chloride and thionyl bromide, in a suitable organic solvent,

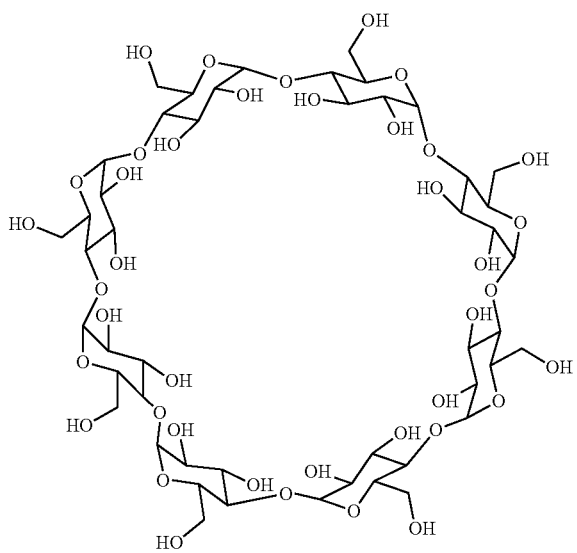

Formula II b) mixing the reaction mixture of step a) with an aqueous solution of base and alcoholic solvent,
c) isolating 6-per-deoxy-6-per-halo-γ-cyclodextrin of formula III, wherein X is bromide or chloride, Formula III

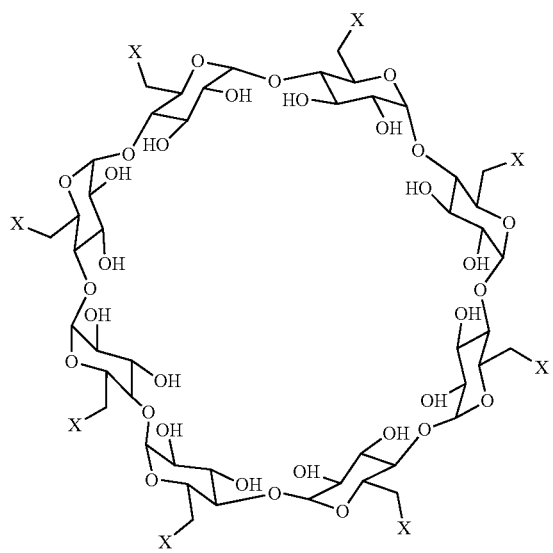

d) optionally, drying said 6-per-deoxy-6-per-halo-γ-cyclodextrin,
e) optionally, purifying the compound of step c) or d),
f) reacting the 6-per-deoxy-6-per-halo-γ-cyclodextrin with 3-mercaptopropionic acid in the presence of alkali metal alkoxide base in a suitable organic solvent to obtain sugammadex.

In another aspect, the present invention relates to an improved process for preparing an intermediate for preparing sugammadex, namely 6-per-deoxy-6-per-halo-γ-cyclodextrin of formula III, wherein x is bromide or chloride, Formula III

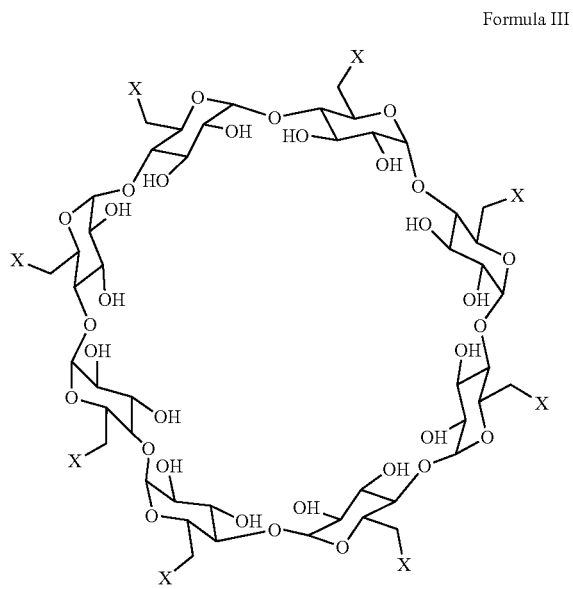

comprising steps of,
a) reacting γ-cyclodextrin of formula II,

Formula II

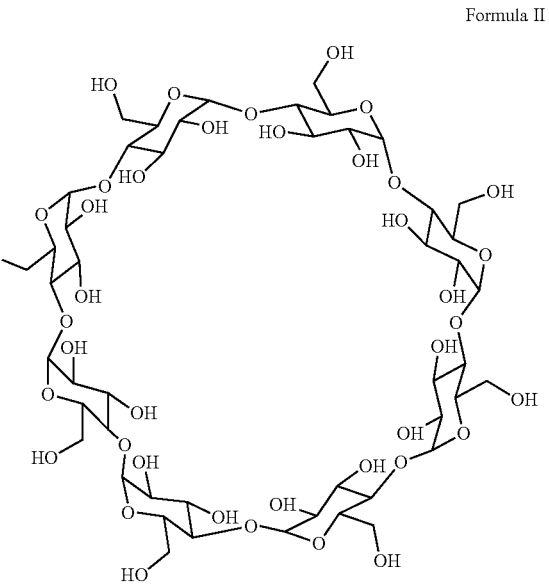

with a halogenating agent, selected from a group consisting of oxalyl chloride, oxalyl bromide, thionyl chloride and thionyl bromide, in a suitable organic solvent,
b) mixing the reaction mixture of step a) with an aqueous solution of base and alcoholic solvent,
c) isolating 6-per-deoxy-6-per-halo-γ-cyclodextrin,
d) optionally, drying the 6-per-deoxy-6-per-halo-γ-cyclodextrin,
e) optionally, purifying the compound of step c) or d).

In yet another aspect, the present invention relates to the isolation of 6-per-deoxy-6-per-halo-γ-cyclodextrin of formula III, wherein x is bromide or chloride, comprising steps of,
a) reacting γ-cyclodextrin of formula II with a halogenating agent, selected from a group consisting of oxalyl chloride, oxalyl bromide, thionyl chloride and thionyl bromide in dimethylformamide,
b1) adding an alcohol, selected from a group consisting of methanol, ethanol, propanol, isopropyl alcohol, n-butanol, iso-butanol, tert-butanol,
b2) mixing the solution of step b1) with a mixture of water, base and alcohol, wherein the alcohol is the same as used in step b1),
b3) stirring,
c) isolating 6-per-deoxy-6-per-halo-γ-cyclodextrin of formula III.

DETAILED DESCRIPTION OF THE INVENTION

Definitions

Figure 1:
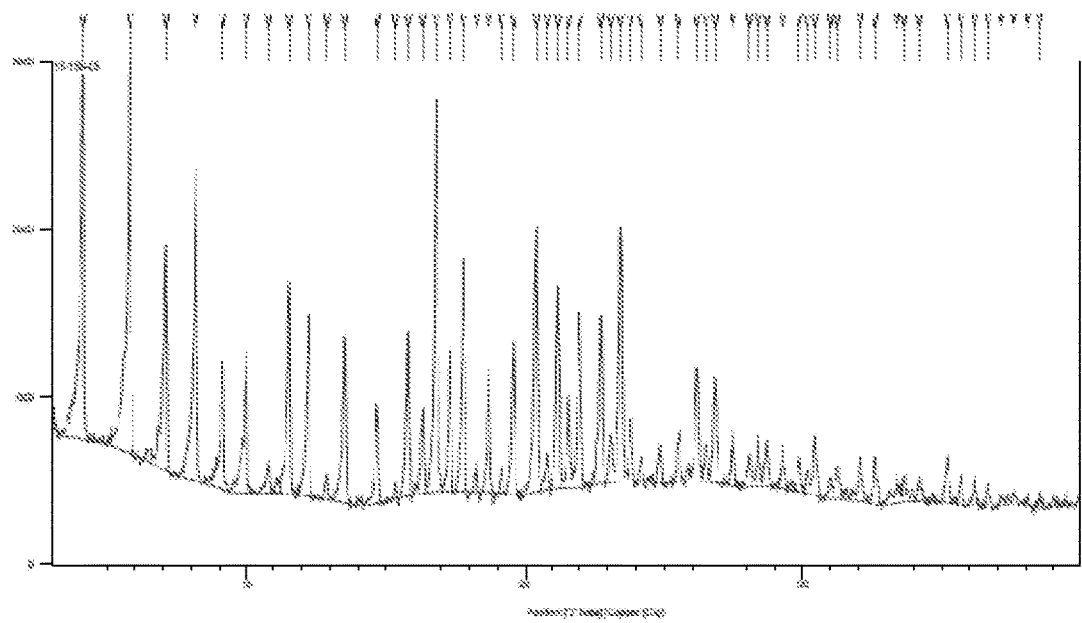
FIG. 1 is an illustration of a XRPD pattern of crystalline form I of 6-per-deoxy-6-per-chloro-γ-cyclodextrin.
Figure 2:
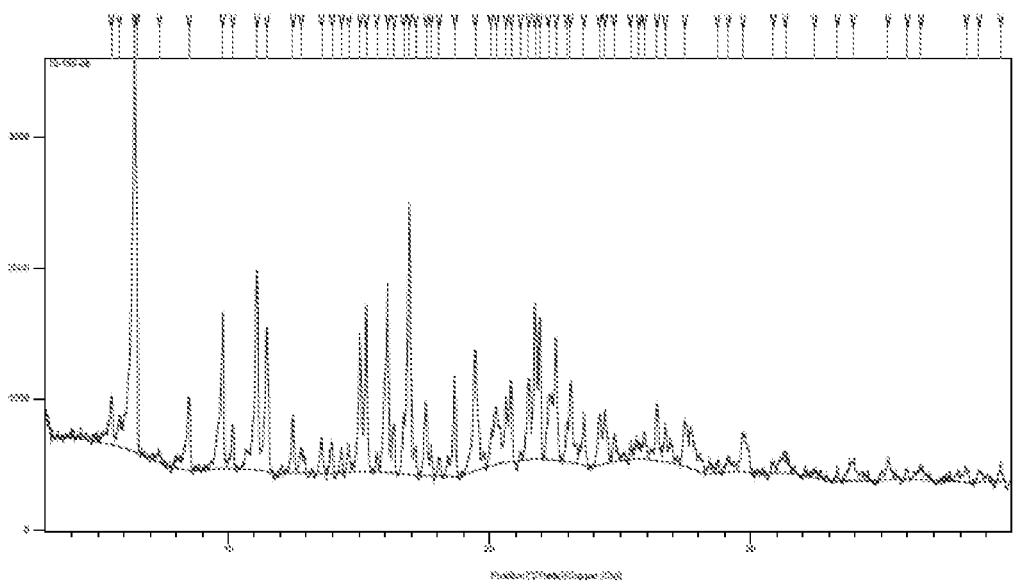
FIG. 2 is an illustration of a XRPD pattern of crystalline form II of 6-per-deoxy-6-per-chloro-γ-cyclodextrin.
Figure 3:
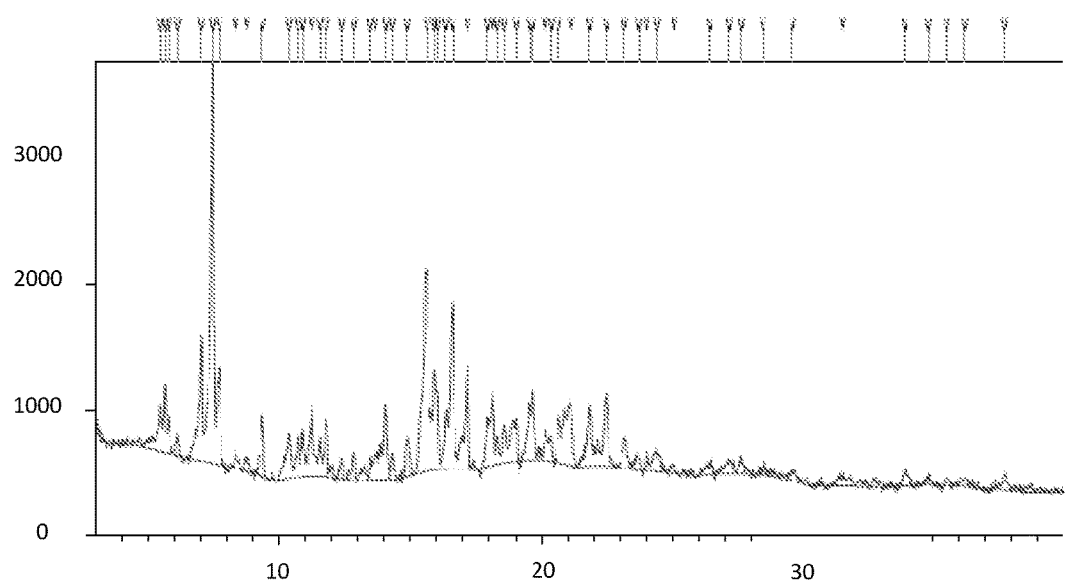
FIG. 3 is an illustration of a XRPD pattern of crystalline form III of 6-per-deoxy-6-per-chloro-γ-cyclodextrin.

The following definitions are used in connection with the present application unless the context indicates otherwise.

The term "anti-solvent" refers to a liquid that, when combined with a solution of 6-per-deoxy-6-per-halo-γ-cyclodextrin, for example, reduces solubility of the 6-per-deoxy-6-per-halo-γ-cyclodextrin in the solution, causing crystallization or precipitation in some instances spontaneously, and in other instances with additional steps, such as seeding, cooling, scratching, and/or concentrating.

The term "halo" means halogen. The term 6-per-deoxy-6-per-halo-γ-cyclodextrin means a perhalogenated γ-cyclodextrin wherein the halogen can be chloride or bromide. The term 6-per-deoxy-6-per-chloro-γ-cyclodextrin means a perhalogenated γ-cyclodextrin wherein the halogen is chloride.

All percentages and ratios used herein are by weight of the total composition and all measurements made are at about 25° C. and about atmospheric pressure, unless otherwise designated. All temperatures are in degrees Celsius unless specified otherwise.

The terms "about," "general," "generally," and the like are to be construed as modifying a term or value such that it is not an absolute. Such terms will be defined by the circumstances and the terms that they modify as those terms are understood by those of skill in the art. This includes, at the very least, the degree of expected experimental error, technique error and instrument error for a given technique used to measure a value.

As used herein, the terms "comprising" and "comprises" mean the elements recited, or their equivalents in structure or function, plus any other element or elements which are not recited. The terms "having" and "including" are also to be construed as open ended. All ranges recited herein include the endpoints, including those that recite a range between two values. Whether so indicated or not, all values recited herein are approximate as defined by the circumstances, including the degree of expected experimental error, technique error, and instrument error for a given technique used to measure a value.

The term "optional" or "optionally" is taken to mean that the event or circumstance described in the specification may or may not occur, and that the description includes instances where the event occurs and instances where it does not.

In general, polymorphism refers to the ability of a substance to exist as two or more crystalline forms that have different spatial arrangements and/or conformations of molecules in their crystal lattices. Thus, "polymorphs" refer to different crystalline forms of the same pure substance in which the molecules have different spatial arrangements of the molecules, atoms, and/or ions forming the crystal. Different polymorphs may have different physical properties such as melting points, solubilities, X-ray diffraction patterns, etc.

Polymorphism may also include solvation or hydration products (also known as pseudopolymorphs) and amorphous forms. Differences in these forms could, in some cases, affect the quality or performance of the new drug products (European Medicines Agency; "Test Procedures and Acceptance Criteria for New Drug Substances and New Drug Products;" Document CPMP/ICH/367/96, May 2000).

In one aspect, the application provides an improved process for the preparation of sugammadex by reacting γ-cyclodextrin of formula II with a halogenating agent, selected from a group consisting of oxalyl chloride, oxalyl bromide, thionyl chloride and thionyl bromide, in a suitable organic solvent to obtain 6-per-deoxy-6-per-halo-γ-cyclodextrin (halogenated γ-cyclodextrin). Said halogenated γ-cyclodextrin is further reacted with 3-mercaptopropionic acid in the presence of alkali metal alkoxide base in a suitable organic solvent to give sugammadex.

The halogenation of γ-cyclodextrin is well known in the art. However most of these processes involve the use of phosphorous-based halogenating reagents. The phosphorous-based halogenating reagents are not favourable as they produce a variety of side products, which are very difficult to remove from the reaction mixture.

The inventors of the present application has surprisingly found that the use of a halogenating agent, selected from a group consisting of oxalyl chloride, oxalyl bromide, thionyl chloride and thionyl bromide, for the halogenation of γ-cyclodextrin provides cleaner reaction. Especially due to the formation of gaseous by-products only, such as carbon monoxide, carbon dioxide and hydrogen chloride. These gaseous by-products do not require any extra process step for removal from the reaction mixture, thus avoiding multiple purification procedures to obtain the desired purity of halogenated γ-cyclodextrin.

The use of a halogenating agent, selected from a group consisting of oxalyl chloride, oxalyl bromide, thionyl chloride and thionyl bromide, also avoids potential side reactions such as the formation of phosphate esters, which are produced as by-product when phosphorous-based halogenating reagents such as phosphorous pentachloride are used. Further, the use of above said halogenating agent of the present application selectively reacts with primary hydroxyls of γ-cyclodextrin to produce desired halogenated product 6-per-deoxy-6-per-halo-γ-cyclodextrin, wherein halo is bromo or chloro.

The suitable organic solvents which may be used during halogenation of γ-cyclodextrin, include but are not limited to aliphatic esters such as ethyl acetate; aliphatic ethers such as tetrahydrofuran; aliphatic amides such as dimethylformamide; nitriles such as acetonitrile, propionitrile; dimethyl sulfoxide, N-methyl-2-pyrrolidone and mixtures thereof.

The halogenation of γ-cyclodextrin produces a complex with the halogenating reagent and solvent, which is further hydrolysed with a suitable base to give 6-per-deoxy-6-per-halo-γ-cyclodextrin. The reported prior art methods for the hydrolysis of the complex results in a highly viscous mixture, which is very difficult to handle. The inventors of the present application has surprisingly found that the mild hydrolysis of the complex of halogenated γ-cyclodextrin with an aqueous solution of base in a suitable solvent/anti-solvent mixture produces a suspension which is not viscous and easier to handle. Preferably the anti-solvent is a mixture of alcoholic solvent and water. The solvent of the solvent: anti-solvent pair can be selected from the list of organic solvents as discussed above, the list of alcoholic solvents and base are discussed below.

According to another aspect of the present application the use of mild hydrolysis condition in a suitable solvent/anti-solvent mixture for the hydrolysis of the halogenated γ-cyclodextrin complex affords crystalline 6-per-deoxy-6-per-halo-γ-cyclodextrin, wherein halo is bromo or chloro.

It is surprisingly found that the use of dimethylformamide as solvent and mixture of water and alcoholic solvent as anti-solvent specifically produces crystalline 6-per-deoxy-6-per-halo-γ-cyclodextrin.

The alcoholic solvents which may be used include, but are not limited to C1-C4 alcohols such as methanol, ethanol, propanol, isopropyl alcohol, n-butanol, iso-butanol, tert-butanol or mixtures thereof.

The suitable bases which may be used include, but are not limited to alkali or alkaline metal hydroxide such as sodium hydroxide, lithium hydroxide, potassium hydroxide and the like; carbonate, bicarbonate such as potassium carbonate, lithium carbonate, sodium carbonate, potassium bicarbonate, lithium bicarbonate, sodium bicarbonate and the like. A useful ratio of the water/alcohol mixture may be in the range of 10/1 to 1/0.1, preferably from 5/1 to 1/0.1 and most preferably from 2/1 to 1/0.05.

Interestingly, it is also observed that the choice of the alcohol influences the crystalline pattern of the isolated 6-per-deoxy-6-per-halo-γ-cyclodextrin, wherein halo is bromo or chloro. In all cases, however, the crystalline pattern was recorded with wet samples of 6-per-deoxy-6-per-halo-γ-cyclodextrin, i.e. the isolated crystals are not subjected to an additional and/or special drying step, like heating or vacuum drying.

Cyclodextrin and its derivatives are known to lose their crystalline habit upon drying (Hunt A. et al, Carbohydrate Res. 2005 Jul. 4; 340 (9):1631-7). Nevertheless, the crystalline forms of the invention strongly improve the filtration time and quality of the intermediate.

A comparison with known prior art processes concerning filtration time and polymorphic form of 6-per-deoxy-6-per-chloro-γ-cyclodextrin is tabulated below (5 g substance each):

TABLE 1

| Reference Examples | Solvent | Anti-solvent | Filtration time | Polymorph |
|---|---|---|---|---|
| WO2001/040316A1 (example 3) | Dimethyl-formamide | Water | >9 hr | Amorphous |
| WO2012/025937A1 (example 1) | Dimethyl-formamide | Water | >3 hr | Amorphous |
| WO2014/125501A1 (example 1) | Dimethyl-formamide | Water | >4 hr | Amorphous |
| Examples of the present application | Dimethyl-formamide | Water/ Methanol | <5 min. | Crystalline form I |
|  | Dimethyl-formamide | Water/ Ethanol | <5 min. | Crystalline form II |
|  | Dimethyl-formamide | Water/ Isopropanol | <5 min. | Crystalline form II |
|  | Dimethyl-formamide | Water/ Tert-butanol | <5 min. | Crystalline form III |

It is evident from the comparative data that the filtration time has been reduced many fold due to the formation of crystalline 6-per-deoxy-6-per-chloro-γ-cyclodextrin as compared to the cumbersome filtration of amorphous material obtained from the known prior art procedures. It is also clearly observed that the use of water and alcoholic solvent as anti-solvent contributes to the formation of crystalline 6-per-deoxy-6-per-chloro-γ-cyclodextrin.

The isolated crystalline forms of 6-per-deoxy-6-per-chloro-γ-cyclodextrin has higher yield (about 94%) and purity (about 94%) as compared to the isolated amorphous form of 6-per-deoxy-6-per-chloro-γ-cyclodextrin of the known prior art methods, as reported in the reference examples 1, 2 and 3.

The present application also provides novel crystalline forms I, II and III of 6-per-deoxy-6-per-chloro-γ-cyclodextrin.

The crystalline form I shows on X-ray diffraction a peak at an angle of refraction 2 theta (θ), of 4.1, 5.8, 8.2, 16.8, 23.5±0.2 degrees; preferably it includes five or more peaks at angles of refraction 2 theta (θ) selected from the group consisting of 4.1, 5.8, 7.1, 8.2, 9.1, 10.0, 10.8, 11.5, 12.2, 12.9, 13.5, 14.7, 15.3, 15.8, 16.3, 16.8, 17.3, 17.8, 18.3, 18.7, 19.1, 19.6, 20.4, 20.8, 21.2, 21.6, 22.0, 22.7, 23.1, 23.5, 23.8, 24.2, 24.9, 25.5, 26.2, 26.5, 26.8, 27.5, 28.1, 28.4, 28.7, 29.3, 29.9, 30.1, 30.4, 31.0, 31.3, 32.1, 32.6, 33.4, 33.7, 34.2, 35.2, 35.7, 36.2, 36.6, 37.1, 37.6, 38.1, and 38.5±0.2 degrees.

The crystalline form II shows on X-ray diffraction a peak at an angle of refraction 2 theta (θ), of 6.4, 11.1, 11.5, 16.1, 16.9±0.2 degrees; preferably it includes five or more peaks at angles of refraction 2 theta (θ) selected from the group consisting of 5.5, 5.8, 6.4, 6.5, 7.4, 8.5, 9.8, 10.2, 11.1, 11.5, 12.5, 12.8, 13.6, 14.0, 14.3, 14.6, 15.0, 15.3, 15.7, 16.1, 16.3, 16.7, 16.9, 17.2, 17.6, 17.8, 18.1, 18.7, 19.4, 20.1, 20.3, 20.6, 20.8, 21.2, 21.5, 21.7, 21.9, 22.3, 22.5, 22.9, 23.1, 23.6, 24.2, 24.4, 24.8, 25.4, 25.7, 25.9, 26.4, 26.7, 27.5, 28.7, 29.1, 29.7, 30.9, 31.3, 32.4, 33.3, 33.9, 35.2, 36.0, 36.5, 38.2, 38.7, 39.6±0.2 degrees.

The crystalline form III shows on X-ray diffraction a peak at an angle of refraction 2 theta (θ), of 7.5, 15.6, 15.9, 16.6, 17.2±0.2 degrees; preferably it includes five or more peaks at angles of refraction 2 theta (θ) selected from the group consisting of 5.5, 5.6, 5.8, 6.1, 7.0, 7.5, 7.7, 8.3, 8.8, 9.4, 10.4, 10.7, 10.9, 11.2, 11.5, 11.8, 12.4, 12.9, 13.5, 13.7, 14.1, 14.3, 14.9, 15.6, 15.9, 16.0, 16.4, 16.6, 17.2, 17.9, 18.1, 18.3, 18.6, 19.0, 19.5, 19.7, 20.2, 20.4, 20.7, 21.1, 21.9, 22.5, 23.2, 23.8, 24.0, 24.4, 25.1, 26.4, 27.2, 27.7, 28.5, 29.6, 31.6, 33.9, 34.8, 35.5, 36.2, 37.7±0.2 degrees.

The obtained 6-per-deoxy-6-per-halo-γ-cyclodextrin or any of its crystalline forms, wherein halo is bromo or chloro, can optionally be purified by a suitable purification methods such as fractional distillation, acid base treatment, slurrying or recrystallization to achieve the desired purity of 6-per-deoxy-6-per-halo-γ-cyclodextrin or any of its crystalline forms. Preferably, the crude 6-per-deoxy-6-per-halo-γ-cyclodextrin can be purified by dissolving in suitable organic solvent followed by addition of a mixture of water and alcoholic solvent to isolate purified 6-per-deoxy-6-per-halo-γ-cyclodextrin. Said suitable organic solvent and alcoholic solvent can be selected from the list as discussed above.

Specifically, the halogenation of γ-cyclodextrin is performed by reacting it with a halogenating agent, selected from a group consisting of oxalyl chloride, oxalyl bromide, thionyl chloride and thionyl bromide, in dimethylformamide (DMF), usually under anhydrous condition at about −15° C. to 30° C., more preferably at about −5° C. to 20° C. The suspension of said halogenating agent can be prepared by slow addition to dimethylformamide at about −5° C. to 15° C. The obtained suspension is further heated and mixed with γ-cyclodextrin. The mixing of γ-cyclodextrin with the suspension of said halogenating agent can be achieved by addition of γ-cyclodextrin to the suspension or vice-versa, in both cases slow addition is preferred. After mixing, the obtained mixture may be stirred at a temperature of about 30° C. to 100° C., more preferably at about 40° C. to 90° C. for a period of about 5 to 25 hours, preferably for about 7 to 20 hours.

The reaction can be monitored by any suitable analytical technique. After completion of the reaction the solution is cooled and an alcoholic solvent, preferably methanol, is added, then stirred for an appropriate period of time. The obtained solution is slowly added to an aqueous solution of base and methanol then stirred for an appropriate time preferably for about 1 to 6 hours, more preferably for about 1 to 4 hours. The halogenated γ-cyclodextrin can be isolated from the reaction mixture by suitable techniques such as filtration, decantation or centrifugation and the like.

The isolated crystalline form of halogenated γ-cyclodextrin i.e. 6-per-deoxy-6-per-halo-γ-cyclodextrin is optionally dried and/or purified, or it can be directly used for the second step. The optional drying may be suitably carried out using any of an air tray dryer, vacuum tray dryer, fluidized bed dryer, spin flash dryer, flash dryer, and the like. The drying may be carried out at any suitable temperatures and under atmospheric pressure or above, or under reduced pressures. The optional purification may be carried out by fractional distillation, acid base treatment, slurrying or recrystallization.

The isolated 6-per-deoxy-6-per-halo-γ-cyclodextrin is further reacted with 3-mercaptopropionic acid in the presence of a base in a suitable solvent to obtain sugammadex. A suitable solvent is dimethylformamide (DMF). A suitable base is the same as discussed with respect to the first reaction step.

Certain specific aspects of the present application will be explained in greater detail with reference to the following examples, which are provided only for purposes of illustration and should not be construed as limiting the scope of the disclosure in any manner.

EXAMPLES

To demonstrate the benefits of the present invention, examples of the prior art were reworked and indicated as reference example.

Reference Example 1 (Example 3 of WO2001/040316A1)

Preparation of 6-per-deoxy-6-per-iodo-γ-cyclodextrin

Triphenylphosphine (15 g) was dissolved in dimethylformamide (80 ml) at ambient temperature and iodine (15.2 g) was slowly added to the solution in 10-15 minutes. To this mixture was added dry γ-cyclodextrin (5 g) and the solution was heated to 70° C. and kept stirring at this temperature for 24 hour. The solution was allowed to cool before the addition of sodium methoxide (1.55 g in 25 ml of methanol). The solution thus obtained was stirred for 30 minutes, poured to 400 ml of methanol and evaporated under vacuum to obtain a dense oily residue. To this residue, 250 ml of water was added to get a dark sticky solid, which was filtered under vacuum. The solid was washed with water (3×50 ml) and methanol (3×50 ml) and dried under vacuum to obtain 2 g of 6-per-deoxy-6-per-iodo-γ-cyclodextrin as a yellow powder. Yield: 40%; HPLC Purity: 20.3%

Reference Example 2 (Example 1 of WO2012/025937A1)

Preparation of 6-per-deoxy-6-per-chloro-γ-cyclodextrin

Phosphorous pentachloride (25.6 g) was slowly added to dimethylformamide (30 ml) at 0-5° C. The suspension was stirred at 25-30° C. for 1 hour before the addition of a solution of γ-Cyclodextrin (5 g) in dimethylformamide (40 ml). The suspension thus obtained was heated at 65-70° C. and stirred at this temperature for 14 hours. Dimethylformamide was removed under vacuum to obtain thick oil. Water (100 ml) was slowly added to the oil followed by sodium hydroxide 20% until pH reached the value of 8.0. The resulted suspension was stirred for 1 hour at 5-10° C. The suspension was filtered and dried under vacuum to obtain 2.5 grams of 6-per-deoxy-6-per-chloro-γ-cyclodextrin as a yellow powder. Yield: 44.8%; HPLC Purity: 22.4%

Reference Example 3 (Example 1 of WO2014/125501A1)

Preparation of 6-per-deoxy-6-per-chloro-γ-cyclodextrin

Phosphorous pentachloride (25.6 g) was slowly added to dimethylformamide (20 ml) at 25-30° C. The suspension was stirred at 25-30° C. for 1 hour before the addition of γ-Cyclodextrin (5 g). The suspension thus obtained was heated at 65-70° C. and stirred at this temperature for 15 hours. The obtained mixture was slowly added to water (100 ml) and cooled at 10° C. followed by addition of sodium hydroxide 30% until pH reached the value of 7.5-8.0. The resulted suspension was stirred for 2 hour at this temperature. The suspension was filtered, washed with water (20 ml) and dried under vacuum to obtain 4.5 grams of 6-per-deoxy-6-per-chloro-γ-cyclodextrin as a yellow powder. Yield: 80.7%; HPLC Purity: 23.0%.

Example 1: Preparation of 6-per-deoxy-6-per-chloro-γ-cyclodextrin

Oxalyl Chloride (62.7 g, 32 eq.) was slowly added to dimethylformamide (120 ml) at room temperature and γ-cyclodextrin (20 g) was added into the reaction mixture. The mixture was heated at 65-70° C. and stirred for 15 hours, then the solution was cooled to room temperature. Methanol (160 ml) was slowly added and the mixture was dropped in a mixture of 49.4 g of potassium bicarbonate in 360 ml of water and 200 ml of methanol. The obtained suspension was stirred for 2 hours, filtered, washed with water/methanol (1/1) (2×100 ml) and dried under vacuum to obtain 20.5 g of 6-per-deoxy-6-per-chloro-γ-cyclodextrin as an off-white powder. Yield: 94%; HPLC Purity: 92.1%

Example 2: Preparation of 6-per-deoxy-6-per-chloro-γ-cyclodextrin

Oxalyl Chloride (469 g, 32 eq.) was slowly added to dimethylformamide (900 ml) at 0-10° C. and stirred for 30 minutes then heated to 60-70° C. and a mixture of γ-cyclodextrin (150 g) in dimethylformamide (300 ml) was added into the reaction mixture at 60-70° C. The reaction mixture was stirred at the same temperature for 15 hours, then the solution was cooled to room temperature. Methanol (1200 ml) was slowly added and the mixture was dropped in a mixture of 463 g of potassium bicarbonate in 2700 ml of water and 1500 ml of methanol. The obtained suspension was stirred for 2 hours, filtered, washed with water/methanol (1/1) (2×750 ml) and dried under vacuum to obtain crude 6-per-deoxy-6-per-chloro-γ-cyclodextrin.

The crude product was dissolved in dimethylformamide (750 ml) and a mixture of water and tert-butanol (1:1) was added to obtain a suspension. The suspension was stirred for 1 hour, cooled to 0-10° C. and again stirred for 2-3 hours then filtered. The obtained solid was taken in tetrahydrofuran/water (1:1) mixture and heated to 50-55° C. and stirred for 30-40 minutes, cooled the mixture to 0-10° C. and stirred for another 3 hours then filtered to obtain pure 6-per-deoxy-6-per-chloro-γ-cyclodextrin.

Example 3: Purification and Isolation of Crystalline Form I of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and methanol (1:1) to obtain a suspension. The suspension was stirred for 1 hour, filtered and the cake was washed two times with a mixture of water and methanol (1:1) to obtain crystalline form I of 6-per-deoxy-6-per-chloro-γ-cyclodextrin. HPLC Purity: 94.4%

Example 4: Purification and Isolation of Crystalline Form II of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and ethanol (1:1) to obtain a suspension. The suspension was stirred for 1 hour, filtered and the cake was washed two times with a mixture of water and ethanol (1:1) to obtain crystalline form II of 6-per-deoxy-6-per-chloro-γ-cyclodextrin. HPLC Purity: 94.9%

Example 5: Purification and Isolation of Crystalline Form II of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and isopropanol (1:1) to obtain a suspension. The suspension was stirred for 1 hour, filtered and the cake was washed two times with a mixture of water and isopropanol (1:1) to obtain crystalline form II of 6-per-deoxy-6-per-chloro-γ-cyclodextrin. HPLC Purity: 95.1%

Example 6: Purification and Isolation of Crystalline Form III of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and tert-butanol (1:1) to obtain a suspension. The suspension was stirred for 1 hour, filtered and the cake was washed two times with a mixture of water and tert-butanol (1:1) to obtain crystalline form III of 6-per-deoxy-6-per-chloro-γ-cyclodextrin. HPLC Purity: 97.4%

Example 7: Preparation of Sugammadex

Sodium tert-butoxide (7.98 g, 24 eq.) was dissolved in dimethylsulfoxide (100 ml) then 3-mercaptopropionic acid (3.62 ml, 4.4 g, 12 eq.) and 6-per-deoxy-6-per-chloro-γ-cyclodextrin (5 g, 1 eq.) were added to obtain a suspension. The suspension was heated to 70° C. overnight. After completion of the reaction, the reaction mixture is filtered and the residue was washed with dimethyl sulfoxide (20 ml) and ethanol (3×50 ml). The obtained residue was dissolved in water (100 ml), filtered and lyophilized to obtain crude sugammadex. The crude sugammadex was dissolved in water (75 ml) and purified by ultrafiltration.

Example 8: Preparation of Sugammadex

Sodium hydride (6.1 g) was added to dimethylformamide (37 ml) at 0° C. A solution of 3-mercaptopropionic acid (7.3 g, 10 eq.) in dimethylformamide (12 ml) was slowly added to the mixture, taking care to not exceed 10° C. The mixture was stirred at 25° C. for 30 min and a mixture of 6-per-deoxy-6-per-chloro-γ-cyclodextrin (10 g) in dimethylformamide (100 ml) was slowly added keeping the temperature in the range of 5-10° C. The mixture was heated at 75° C. and stirred at this temperature for 12 hours. The mixture was cooled to 25°, DMF was partially removed under vacuum and the mixture was diluted with ethanol (150 ml) to obtain a suspension that was stirred for 1 hour at 25° C. The suspension was filtered and dried to obtain crude Sugammadex that was purified over silica gel and Sephadex G-25 column, using water as eluent.

The invention claimed is:
1. A process for preparing sugammadex of formula I,

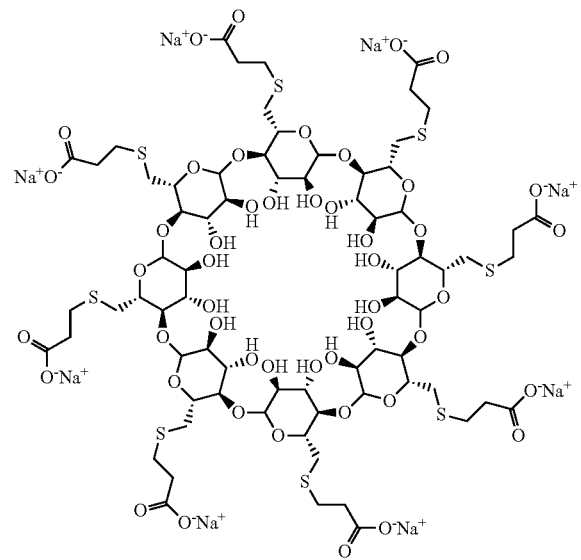

Formula I comprising,
a) reacting γ-cyclodextrin of formula II,

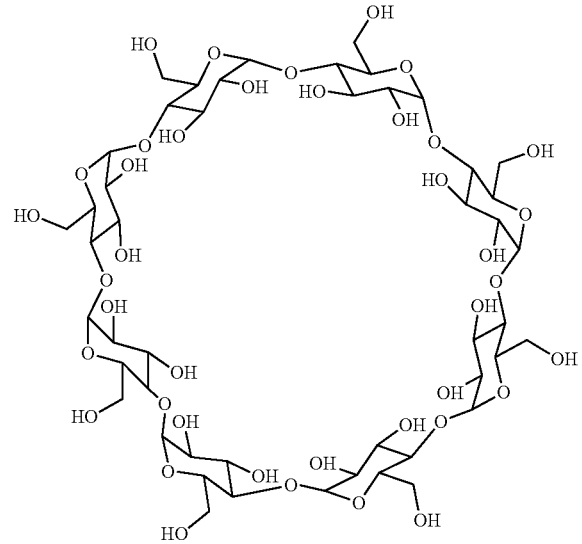

Formula II with a halogenating agent, selected from oxalyl chloride, oxalyl bromide, thionyl chloride and thionyl bromide, in an organic solvent, b) mixing the reaction mixture of step a) with an aqueous solution of base and alcoholic solvent,
c) isolating 6-per-deoxy-6-per-halo-γ-cyclodextrin of compound of formula III, wherein X is bromide or chloride, Formula III

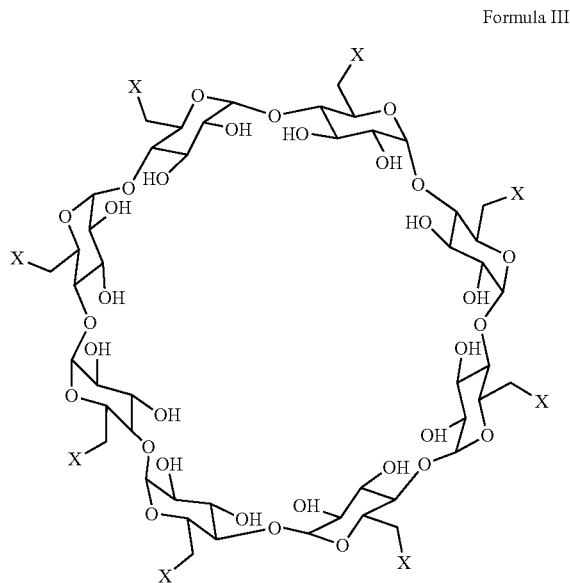

d) optionally, drying the 6-per-deoxy-6-per-halo-γ-cyclodextrin,
e) optionally, purifying the compound of step c) or d), and
f) reacting the 6-per-deoxy-6-per-halo-γ-cyclodextrin with 3-mercaptopropionic acid in presence of alkali metal alkoxide base in an organic solvent to obtain sugammadex.

2. A process for preparing 6-per-deoxy-6-per-halo-γ-cyclodextrin of formula III, wherein X is bromide or chloride, Formula III

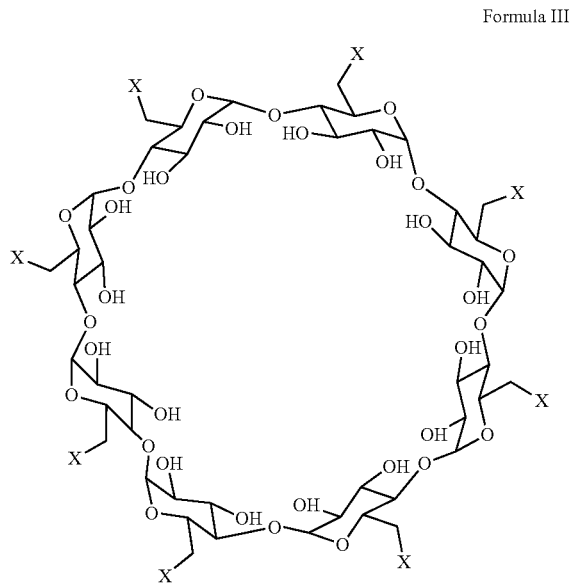

comprising,
a) reacting γ-cyclodextrin of formula II,

Formula II

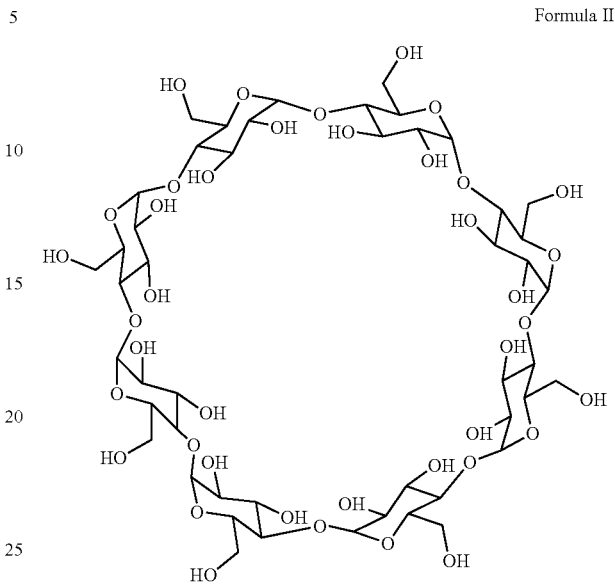

with a halogenating agent, selected from oxalyl chloride, oxalyl bromide, thionyl chloride and thionyl bromide, in an organic solvent,
b) mixing the reaction mixture of step a) with an aqueous solution of base and alcoholic solvent,
c) isolating 6-per-deoxy-6-per-halo-γ-cyclodextrin,
d) optionally, drying the 6-per-deoxy-6-per-halo-γ-cyclodextrin, and
e) optionally, purifying the compound of step c) or d).

3. The process according to claim 1, wherein the organic solvent is selected from ethyl acetate, acetonitrile, propionitrile, tetrahydrofuran, dimethylformamide, dimethylacetamide, N-methyl-2-pyrrolidone, dimethyl sulfoxide and mixtures thereof.

4. The process according to claim 1, wherein the base is selected from alkali or alkaline metal hydroxides, carbonates, and bicarbonates.

5. The process according to claim 4, wherein the base is selected from lithium hydroxide, potassium hydroxide, sodium hydroxide, sodium carbonate, lithium carbonate, potassium carbonate, sodium bicarbonate, potassium bicarbonate, lithium bicarbonate and mixtures thereof.

6. The process according to claim 1, wherein the alcoholic solvent is selected from methanol, ethanol, propanol, isopropyl alcohol, n-butanol, isobutanol, tert-butanol and mixtures thereof.

7. The process according to claim 1, wherein the alkali metal alkoxide base is selected from sodium methoxide, potassium methoxide, sodium tert-butoxide, and potassium tert-butoxide.

8. The process according to claim 1, wherein the organic solvent of step f) is dimethylformamide.

9. The process according to claim 1, wherein isolation of 6-per-deoxy-6-per-halo-γ-cyclodextrin of formula III, comprises:
b1) adding an alcohol, selected from methanol, ethanol, propanol, isopropyl alcohol, n-butanol, iso-butanol, and tert-butanol, b2) mixing the solution of step b1) with a mixture of water, base and alcohol, wherein the alcohol is the same as used in step b1), b3) stirring, and c) isolating 6-per-deoxy-6-per-halo-γ-cyclodextrin.

10. The process according to claim 1, wherein the halogenating agent is oxalyl chloride or thionyl chloride.

11. A crystalline form of 6-per-deoxy-6-per-halo-γ-cyclodextrin, wherein halo is bromo or chloro.

12. The crystalline form according to claim 11, wherein the crystalline form of 6-per-deoxy-6-per-chlor-γ-cyclodextrin is a polymorph of form I, form II or form III.

* * * * *